United States Patent [19]
Mattes et al.

[11] Patent Number: 5,795,069
[45] Date of Patent: Aug. 18, 1998

[54] TEMPERATURE SENSOR AND METHOD

[75] Inventors: Michael F. Mattes, Janesville; James D. Seefeldt, DeForest; Paul B. Rozgo, Janesville, all of Wis.

[73] Assignee: SSI Technologies, Inc., Janesville, Wis.

[21] Appl. No.: 778,164

[22] Filed: Jan. 2, 1997

Related U.S. Application Data

[63] Continuation-in-part of Ser. No. 286,784, Aug. 5, 1994, abandoned.

[51] Int. Cl.$^6$ ............................................. G01K 7/00
[52] U.S. Cl. ...................................... 374/183; 327/513
[58] Field of Search .................................. 374/144, 152, 374/163, 173, 183, 185; 327/509, 512, 513; 338/25; 324/706, 721, 725

[56] References Cited

U.S. PATENT DOCUMENTS

| | | | |
|---|---|---|---|
| 2,971,379 | 2/1961 | Weisheit | 374/183 |
| 3,188,594 | 6/1965 | Koller et al. | 338/28 |
| 3,198,012 | 8/1965 | Argue et al. | 73/362 |
| 3,577,074 | 5/1971 | Praglin | 324/98 |
| 3,612,535 | 10/1971 | Davis et al. | 273/135 |
| 3,817,104 | 6/1974 | Sapir | 73/362 |
| 3,893,341 | 7/1975 | Acres | 73/362 |
| 3,943,434 | 3/1976 | Haeusler et al. | 323/69 |
| 4,004,462 | 1/1977 | Dobkin | 73/362 |
| 4,047,436 | 9/1977 | Bernard et al. | 73/362 |
| 4,171,509 | 10/1979 | Stephens et al. | 374/185 X |
| 4,205,556 | 6/1980 | Runyan | 73/727 |
| 4,224,537 | 9/1980 | Glazer | 307/310 |
| 4,229,692 | 10/1980 | Graeme | 324/62 |
| 4,243,898 | 1/1981 | Seelbach | 307/310 |
| 4,320,664 | 3/1982 | Rehn et al. | 73/708 |
| 4,467,309 | 8/1984 | Matsushita et al. | 338/22 |
| 4,556,330 | 12/1985 | Regtien | 374/185 |
| 4,618,818 | 10/1986 | Horn | 324/62 |
| 4,622,856 | 11/1986 | Binder et al. | 73/727 |
| 4,670,731 | 6/1987 | Zeile et al. | 338/225 |
| 4,754,254 | 6/1988 | Hosokawa et al. | 338/25 |
| 4,890,052 | 12/1989 | Hellums | 323/315 |
| 5,030,849 | 7/1991 | Brokaw | 307/310 |
| 5,137,370 | 8/1992 | McCulloch et al. | 374/173 |
| 5,159,277 | 10/1992 | Mount | 324/721 |
| 5,243,319 | 9/1993 | Brokaw | 338/195 |
| 5,282,685 | 2/1994 | Koegler | 374/172 |
| 5,382,841 | 1/1995 | Feldbaumer | 326/30 |
| 5,398,194 | 3/1995 | Brosh et al. | 364/483 |
| 5,447,073 | 9/1995 | Kalinoski | 73/861.24 |
| 5,463,904 | 11/1995 | Kalinoski | 73/861.24 |
| 5,489,547 | 2/1996 | Erdeljac et al. | 437/60 |

FOREIGN PATENT DOCUMENTS

| | | | |
|---|---|---|---|
| 1 272 009 | 7/1968 | Germany. | |
| 2300479 | 7/1973 | Germany | G01D 3/02 |
| 55-180898 | 10/1982 | Japan | G01K 7/00 |
| WO 91/00503 | 1/1991 | WIPO | G01K 7/20 |

OTHER PUBLICATIONS

Practical Design Techniques Tame Thermistor Nonlinearities, Harry L. Trietley, Jan. 20, 1983, pp. g3–g6.
Effiziente Linearisierung Fur Platin–Temperaturfuhler, F. Kreid, Nov. 1988, pp. 438–443.
The Hewlett Packard Company, "Application Note 290—Practical Temperature Measurements", pp. Z–7–Z28.

*Primary Examiner*—Richard Chilcot
*Assistant Examiner*—Paul D. Amrozowicz
*Attorney, Agent, or Firm*—Michael, Best & Friedrich LLP

[57] ABSTRACT

A temperature sensor using doped polysilicon resistors in a bridge configuration, an amplifier, and a doped polysilicon feedback resistor between the input and the output of the amplifier. The polysilicon resistors are doped with selected concentrations of impurities such as boron, phosphorus, arsenic or antimony. The resistors are doped to establish predetermined temperature coefficients so that the resistors exhibit a predetermined temperature dependence. This temperature dependence is utilized to create a temperature sensor that is stable, accurate, and rugged and that has a generally linear output to temperature response.

28 Claims, 1 Drawing Sheet

TEMPERATURE SENSOR AND METHOD

RELATED APPLICATION

This application is a continuation-in-part of application Ser. No. 08/286,784, filed on Aug. 5, 1994, now abandoned.

BACKGROUND OF THE INVENTION

The invention relates to sensors and, in particular, to temperature sensors and methods for measuring ambient temperature.

Known temperature sensors employ a variety of methods of measuring ambient temperatures. The thermocouple method takes advantage of the fact that, when two wires composed of dissimilar metals are joined at the ends and one of the ends is heated, there is a continuous current generated which flows in the thermo-electric circuit. If the circuit is broken at the center, an open circuit voltage is created which is a function of the junction temperature and the composition of the two dissimilar metal wires. However, the open circuit voltage to temperature relation is non-linear and the thermocouple typically exhibits poor sensitivity and stability characteristics making it difficult to employ in most situations.

The resistance temperature detector (RTD) takes advantage of the principal that the resistivity of metals is, to a small degree, dependent upon temperature. However, the RTD is typically very expensive (because the most commonly used metal for the RTD is platinum), has a low absolute resistance, and results in a small change in resistance relative to a change in temperature. One variation of the RTD is the metal film RTD. A thin metal film of platinum or metal-glass slurry is deposited or screened onto a small flat ceramic substrate, etched with a laser trim system and sealed. While the metal film RTD's are relatively easy to manufacture and offer increased resistance, they are less stable than the traditional RTD's.

The thermistor has also been employed to measure temperature. The thermistor is a temperature sensitive resistor and is generally composed of semi-conductor materials. While the thermistor is sensitive, it is also extremely non-linear and the response of the thermistor to temperature changes is highly dependent upon the process used to manufacture the thermistor. Additionally, the thermistor is extremely fragile and suffers from the additional problem of self-heating. That is, the thermistor generates sufficient energy to heat itself causing a concomitant increase in the resistivity of the thermistor.

The integrated circuit temperature sensor has also been used to measure temperatures. The integrated circuit sensor typically employs an integrated diode whose output characteristics are dependent upon temperature. Like the thermistor, the integrated circuit sensor suffers from self-heating and offers an extremely slow response to changes in temperature.

It is also known that integrated circuit resistors exhibit a resistivity which is dependent upon the temperature of the resistor and that this temperature dependence varies in accordance with the type and amount of impurity with which the resistor is doped. This temperature dependency has been considered a significant problem in integrated circuit technology because any integrated circuit employing these resistors exhibits some degree of temperature dependence requiring compensation.

SUMMARY OF THE INVENTION

In general terms, the invention provides a first embodiment of a temperature sensor for producing an electrical signal related to ambient temperature, and including temperature responsive means for generating a differential voltage output functionally related to ambient temperature, and amplifier means connected to the temperature responsive means for amplifying the differential output. Preferably, the invention provides a first embodiment of a temperature sensor including integrated thin film silicon or polysilicon resistors that are doped with selected concentrations of impurities such as boron, phosphorus, arsenic or antimony. The type and amount of dopant for the selected resistors is chosen so as to establish a predetermined temperature coefficient in at least some of the resistors so that the resistors exhibit a predetermined temperature dependence. This temperature dependence is utilized within the circuit of the temperature sensor to create a temperature sensor that is stable, accurate, and rugged and that has a generally linear output to temperature response.

The ability to select a predetermined temperature dependence allows varying degrees of linearity or non-linearity to be designed into the circuit. If a linear response is desired, the doped resistors are usually doped with boron at a concentration of between $5 \times 10^{15}$ ions/cm$^2$ to $5 \times 10^{16}$ ions/cm$^2$ or doped with phosphorus at a concentration of between $1 \times 10^{15}$ ions/cm$^2$ to $1 \times 10^{16}$ ions/cm$^2$.

The circuit of the temperature sensor includes a resistor bridge, in the form of a wheatstone bridge that includes a first resistor arm having serially connected resistors R1 and R2 with a first node between R1 and R2, and a second resistor arm having serially connected resistors R3 and R4 with a second node between R3 and R4. The resistors R1 and R2 have dissimilar temperature coefficients in order to provide at the first node a reference voltage that decreases with increasing temperatures. The resistors R3 and R4 also have dissimilar temperature coefficients in order to provide at the second node a voltage that increases with increasing temperatures. The first node is electrically connected to the inverting input of an operational amplifier and the second node is connected to the non-inverting input of the operational amplifier. The operational amplifier includes an output ($V_{out}$) and a feedback resistor $R_f$ is connected between the $V_{out}$ and the first node or inverting input of the operational amplifier. $R_f$ has a temperature coefficient that results in a gain for the amplifier which increases with increasing temperature to provide an output ranging from zero to five volts in response to a temperature range of $-40°$ to $+150°$ centigrade with very little non-linearity. The gain of the amplifier is determined by the equation $R_f$ divided by the Thevenin equivalent resistance seen at the non-inverting input of the operational amplifier.

A principal advantage of the first embodiment of the temperature sensor is the provision of a method of measuring temperature and a temperature sensing circuit that uses thin film silicon or polysilicon resistors that are selectively doped with boron, phosphorus, or other impurities to create a resistor having a predetermined temperature coefficient such that the resistivity of the resistor responds to temperature in a predetermined way.

Another advantage of the first embodiment of the temperature sensor is the provision of an operational amplifier and biasing resistors for the operational amplifier that vary the gain of the amplifier in accordance with the ambient temperature.

Another advantage of the first embodiment of the temperature sensor is the provision of a method for measuring temperature and a temperature sensor circuit using integrated silicon and polysilicon resistors having a selected temperature coefficient.

Another advantage of the first embodiment of the temperature sensor is the provision of a method for measuring temperature and a circuit having a substantially linear output from zero to five volts in response to a temperature range of −40° C. to +150° C.

The invention also provides for a second embodiment of a temperature sensor wherein the sensor includes a feedback and biasing network comprised of three doped polysilicon resistors that are doped at the same level therefore making the gain not change with temperature. The temperature sensitive element of the sensor is a voltage divider made up of the two doped polysilicon resistors, one resistor having a positive temperature coefficient and the other resistor having a negative temperature coefficient. The temperature sensor operates with one half bridge responding to temperature and the other half bridge maintaining a constant gain and setting an offset voltage independent of temperature. Through the use of such a configuration, an operational amplifier can be utilized as a single ended amplifier due to the offset voltage created by the circuit.

Other features and advantages of the invention will become apparent to those of ordinary skill in the art upon review of the following detailed description, claims and drawings.

DETAILED DESCRIPTION OF THE PREFERRED EMBODIMENT

Figure 1:
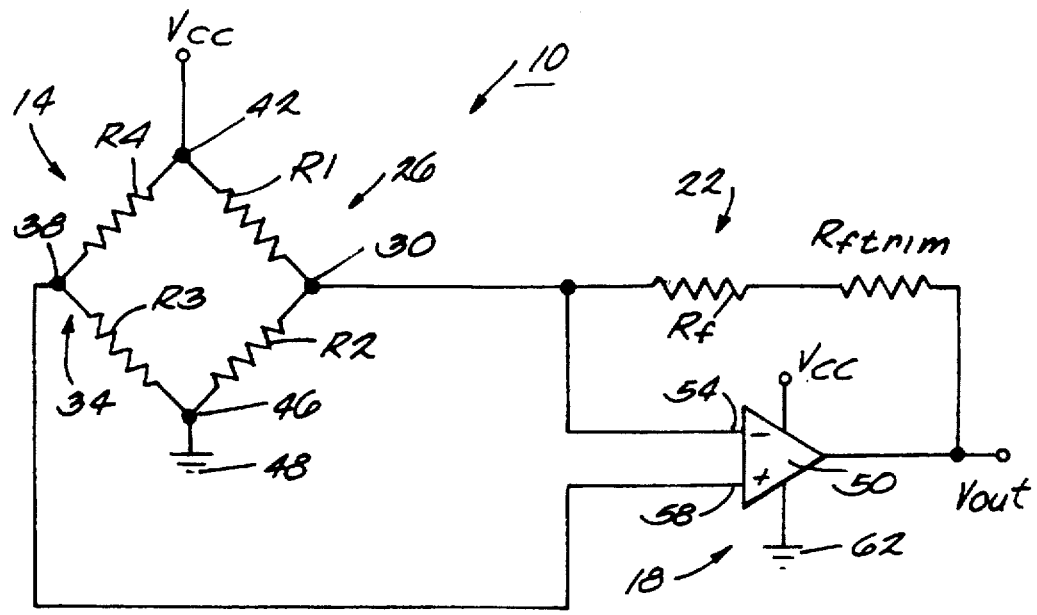
FIG. 1 is a schematic diagram of a first embodiment of a temperature sensor of the invention.

Shown schematically in FIG. 1 is a first embodiment of a temperature sensor. The temperature sensor 10 includes temperature responsive means 14 for generating a differential voltage functionally related to ambient temperature, amplifier means 18 connected to the temperature responsive means 14 for amplifying the differential output, and means 22 for adjusting the gain of the amplifier means 18 in response to variations in the ambient temperature so as to generate an electrical signal at the output of the amplifier which signal is indicative of the ambient temperature.

In the preferred embodiment, the temperature sensor 10 is an integrated circuit which is preferably, though not necessarily, formed on a single substrate. The formation of the circuit on a single substrate assures that the individual elements of the circuit would be exposed to the same temperature variations and thereby provide a consistent reliable electrical output which is indicative of the ambient temperature to which the circuit is exposed.

In the illustrated embodiment of FIG. 1, the temperature responsive means 14 is a resistor bridge network that may be a half-bridge resistor network, a full-bridge resistor network or any other combination of silicon or polysilicon resistors that have an impedance that varies with temperature as a result of the selected doping of impurities in the resistors. The temperature responsive means 14 could even be a single resistor in a network that causes a varying voltage to develop across the resistor and causes the voltage to vary in response to the changes in ambient temperature.

In the embodiment shown in FIG. 1, the temperature responsive means 14 is a full-bridge resistor network including a first arm 26 having first and second serially connected resistors R1 and R2 respectively and a node 30 between the resistors R1 and R2. The resistors R1 and R2 are formed of a silicon or polysilicon material which is selectively doped with an impurity such as boron or phosphorus. Doping of the resistors with such impurities varies the temperature coefficients of the resistors so that the impedance of the resistors varies in accordance with the ambient temperature to which the resistors are exposed. The concentration of the dopant is typically expressed in ions/cm². In the embodiment shown in FIG. 1, resistor R1 is doped with $1.8 \times 10^{16}$ ions/cm² phosphorous and the resistor R2 is doped with $5 \times 10^{15}$ ions/cm² boron. The use of different dopants or varying concentration of the dopants assures that the resistors R1 and R2 have dissimilar temperature coefficients so as to provide at the node 30 a reference voltage that decreases with increases in the ambient temperature. Many available impurities or concentrations of the impurities may be appropriate, and these will vary depending upon the desired output characteristics, for example, linear or non-linear, and the circuit topology which dictates the mathematical relationships between the individual components. In the embodiment shown in FIG. 1, the temperature coefficients are as follows:

TCR1=967 ppm/°C.; where TCR1 is the temperature coefficient of R1;

TCR2=427 ppm/°C.; where TCR2 is the temperature coefficient of R2.

These temperature coefficients result in temperature dependent impedances for R1 and R2 of:

$$R_t1 = R1 + R1(967 \text{ ppm/°C.})(T - 25° \text{ C.})$$

$$R_t2 = R2 + R2(427 \text{ ppm/°C.})(T - 25° \text{ C.}).$$

The temperature responsive means 14 also includes a second arm 34 having a third resistor R3, a fourth resistor R4 connected in series with the third resistor R3, and a node 38 between the third and fourth resistors R3 and R4. Like the resistors R1 and R2 of the first arm 26, the resistors R3 and R4 are silicon or polysilicon resistors that are doped with impurities such as boron or phosphorus so that the resistors R3 and R4 each have a predetermined temperature coefficient. The predetermined temperature coefficients cause the impedances of the resistors R3 and R4 to vary according to temperature. In particular, the temperature coefficients of resistors R3 and R4 are precisely selected so as to generate a reference voltage at the node 38 that increases in accordance with increases in the ambient temperature. While many available impurities or concentrations of impurities are appropriate, the resistor R3 is doped with a concentration of $5 \times 10^{15}$ ions/cm² boron and the resistor R4 is doped with $1.8 \times 10^{16}$ ions/cm² phosphorous. In the embodiment shown in FIG. 1, the temperature coefficients of R3 and R4 are as follows:

TCR3=427 ppm/° C.; where TCR3 is the temperature coefficient of R3;

TCR4=967 ppm/° C.; where TCR4 is the temperature coefficient of R4.

These temperature coefficients result in temperature dependent impedances for R3 and R4 of:

$$R_t3 = R3 + R3(427 \text{ ppm/°C.})(T - 25° \text{ C.})$$

$$R_t4 = R4 + R4(967 \text{ ppm/°C.})(T - 25° \text{ C.}).$$

The first arm 26 and second arm 34 are connected in parallel so that resistor R1 is connected to resistor R4 at node 42 and resistor R2 is connected to resistor R3 at node 46. Node 42 is connected to a voltage source $V_{cc}$ to provide power to the circuit. The voltage source is a regulated positive 5 volt direct current source. The node 46 is connected to a common or ground connection 48.

The output of the temperature responsive means 14 is the differential voltage across the nodes 30 and 38. Because the temperature responsive means 14 is a resistor network in which the output of the resistors R1, R2, R3 and R4 is dependant upon the interaction of the resistors, the discreet values of the resistors (at a selected reference temperature) are not as significant as the scaled or normalized values of the resistors R1, R2, R3 and R4 relative to one another. The normalized values of the resistors R1, R2, R3, and R4 of temperature responsive means 14 at 25° C. are as follows:
R1=1.0 ohm
R2=1.0 ohm
R3=1.015 ohms
R4=1.0 ohm The amplifier means 18 is preferably an operational amplifier 50 formed on the same integrated circuit substrate as the temperature responsive means 14. The operational amplifier 50 includes an inverting input 54 which is connected to the node 30, and a non-inverting input 58 which is connected to the node 38. Therefore, the operational amplifier 50 receives an input which is the differential of the reference voltage created by resistor R1 and R2 at the node 30 and the reference voltage created by resistors R3 and R4 at the node 38. As is known in the art, the operational amplifier 50 is also connected to $V_{cc}$ and to a ground or common connection 62. The operational amplifier 50 also includes an output $V_{out}$ and a feedback resistor $R_f$ connected between the output $V_{out}$ and the inverting input 54 of the operational amplifier 50. Though not necessary, the operational amplifier 50 also includes a trim or calibrating resistor $R_{f\,trim}$ connected serially to feedback resistor $R_f$ to allow for calibration of the amplifier.

As is commonly known in the art, the amplifier means 18 has a gain which may be selectively established based on the components connected to the operational amplifier 50. The gain may be a voltage gain, a current gain, a transimpedance, or a transconductance and the gain may be a positive, a negative or an unity gain (ignoring temperature related adjustments). In the case of the temperature sensor 10 shown in FIG. 1, the amplifier is in a voltage gain configuration and the gain is determined by the equation $$A = R_f / R_{in}$$

where $R_{in}$ equals the Thevenin equivalent resistance $R_{thev}$ seen at the inverting input 54 of the operational amplifier 50. At 25° C., the Thevenin equivalent resistance $R_{thev}$ is determined by the following equation:

$$R_{thev} = \frac{R1 \times R2}{[R1 + R2]}$$

Taking into account the temperature dependence of the resistors R1 and R2, the Thevenin equivalent resistance $R_{thev}$ at any temperature is:

$$R_{t\,thev} = \frac{R_t 1 \times R_t 2}{[R_t 1 + R_t 2]}$$

The Thevenin equivalent voltage source at any temperature is:

$$V_{thev} = V_{cc} \left[ \frac{R_t 2}{R_t 1 + R_t 2} \right].$$

As discussed above, the temperature sensor 10 also includes means 22 for adjusting the gain of the amplifier means 18 in response to variations in ambient temperature so as to generate an electrical signal at the output which is indicative of the ambient temperature. The means 22 for adjusting the gain of the amplifier is integral with the feedback resistor and the resistors R1 and R2 in the first arm 26 of the resistor network. The feedback resistor $R_f$ is a silicon or polysilicon thin film resistor that is doped with an impurity such as boron or phosphorus in select concentrations to establish a predetermined temperature coefficient. While many available impurities or concentrations of impurities are appropriate, the feedback resistor $R_f$ is doped with a concentration of $1.8 \times 10^{16}$ ions/cm² phosphorus which results in a temperature coefficient of: TCRF=967 ppm/°C. and a temperature dependent resistance $R_{tf}$ which is defined by the equation:

$$R_{tf} = R_f + R_f (967 \text{ ppm/°C.}) (T - 25° \text{ C.})$$

Because of the predetermined temperature coefficient, the impedance of the feedback resistor $R_f$ varies in a predetermined way in accordance with changes in ambient temperature. Substituting $R_{tf}$ and $R_{t\,thev}$ into the gain equation results in the following temperature dependent mathematical relationship for the gain of operational amplifier 50 at any temperature:

$$\text{Gain} = \frac{R_{tf}}{\left[ \frac{R_t 1 \times R_t 2}{[R_t 1 + R_t 2]} \right]};$$

and the temperature dependent output of the operational amplifier 50 is determined by:

$$\text{Output} = \left( 1 + \frac{R_{tf}}{R_{t\,thev}} \right) \left( \frac{R_t 3}{R_t 4 + R_t 3} \right) V_{cc} - \left( \frac{R_{tf}}{R_{t\,thev}} \right) V_{thev}$$

In operation, the temperature sensor 10 is designed to produce an output of zero volts d.c. at −40° C. The output response of the temperature sensor 10 preferably, though not necessarily, increases linearly to a full-scale 5.0 volt d.c. output at a temperature of 150° C. To calibrate the temperature sensor 10, the voltage at the node 38 is measured at 25° C. and R3 is trimmed until that voltage measures 2.48 volts d.c. Next, the voltage at the node 30 is measured at 25° C. and R1 is trimmed until that voltage is 2.5 d.c. Finally, the output voltage $V_{out}$ is measured at 25° C. and the gain of operational amplifier 50 is adjusted by trimming $R_{f\,trim}$ until $V_{out}$=1.731 volts d.c.

At −40° C. the temperature sensor 10 generates an output of approximately zero volts d.c. As ambient temperature increases, the voltage at the node 30 decreases, the voltage at the node 38 increases and the gain of the operational amplifier 50 varies according to the above-identified temperature dependant gain equation so that at zero °C., $V_{out}$ is approximately 1.049 volts d.c.; at 25° C., $V_{out}$ is approximately 1.731 volts d.c.; at 80° C., $V_{out}$ is approximately 3.182 volts d.c.; and at 150° C., $V_{out}$ is approximately 5.0 volts d.c.

Figure 2:
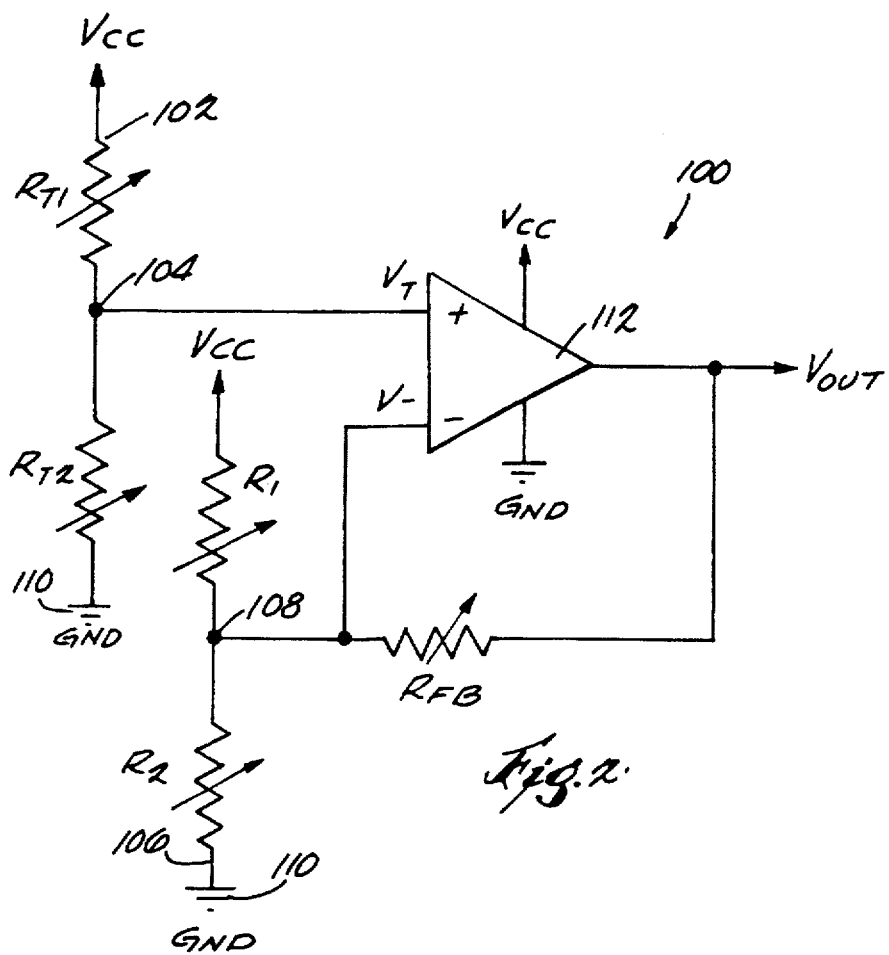
FIG. 2 is a schematic diagram of a second embodiment of a temperature sensor of the invention.

Referring now to FIG. 2, a second embodiment of the temperature sensor is illustrated. The second embodiment, sensor 100, is similar to the first embodiment of FIG. 1 with the following changes.

The temperature sensor 100 includes temperature sensing element such as a first arm 102 having first and second serially connected resistors $R_{T1}$ and $R_{T2}$ respectively and a node 104 therebetween. The resistors $R_{T1}$ and $R_{T2}$ are formed of a silicon or polysilicon material which is selectively doped with an impurity such as boron or phosphorus. Doping of the resistors with such impurities varies the temperature coefficients of the resistors so that the impedance of the resistors varies in accordance with the ambient temperature to which the resistors are exposed. While other dopants such as boron, arsenic and antimony may be appropriate, in the preferred embodiment, the resistor $R_{T1}$ is implanted with low dose phosphorus at a level of $2.0 \times 10^{15}$ $cm^{-2}$ at 80 keV with an impedance value of approximately 240 ohms/square at 25 C, and the resistor $R_{T2}$ is doped in situ with phosphorus during the polysilicon LPCVD with an impedance value of approximately 20 ohms/square at 25 C. The use of different dopants or varying concentrations of the dopants assures that the resistors $R_{T1}$ and $R_{T2}$ have dissimilar temperature coefficients so as to provide at the node 104 a voltage $V_T$ that changes with changes in ambient temperature.

The temperature sensor 100 also includes a resistor network such as a second arm 106 which includes a resistor $R_1$ and a resistor $R_2$ connected in series and a node 108 therebetween. The resistors $R_1$ and $R_2$ are silicon or polysilicon resistors that are doped with the same impurities at the same level so as to have the same temperature coefficient.

As shown in FIG. 2, both resistors $R_{T1}$ and $R_1$ are connected to a voltage source $V_{cc}$ to provide power. Preferably, $V_{cc}$ is a regulated positive 5 volt direct current source. Resistors $R_{T2}$ and $R_2$ are connected to a common or ground connection 110.

The temperature sensor of the second embodiment further includes an amplifier 112 and a feedback resistor $R_{FB}$. The amplifier 112 is preferably a standard operational amplifier having an output $V_{out}$. Due to the design of the temperature sensor 100, an instrumentation amplifier is not necessary. Node 104 is connected to the positive input of the amplifier 112 and node 106 is connected to the negative input of the amplifier 112. The feedback resistor $R_{FB}$ is connected between the output $V_{out}$ and the negative input of the amplifier 112.

The resistor $R_{FB}$ is doped at the same level with the same material as the resistors $R_1$ and $R_2$ so as to have the same temperature coefficient. For example, the resistors $R_1$, $R_2$ and $R_{FB}$ are implanted with phosphorus at level of $2.0 \times 10^{15}$ $cm^{-2}$ at 80 keV.

Thus, the feedback gain of the sensor 100 does not change with temperature. The resistors $R_1$, $R_2$ and $R_{FB}$ make up a feedback network to set the gain as follows:

$$\text{gain } A = R_{FB}/(R_1//R_2)+1$$

The amplifier element, which includes the resistors $R_1$, $R_2$ and $R_{FB}$ and the operational amplifier, is a single input non-inverting input with the above gain A.

The temperature sensing element of sensor 100 is the voltage divider made up of the two resistors $R_{T1}$ and $R_{T2}$. The voltage $V_T$ varies with temperature and is amplified by the gain A such that:

$$V_T = R_{T2}/(R_{T2}+R_{T1})*V_{cc}$$

$$R_{T2}=R_{T20}(1+\alpha_2(T-T_0)+\beta_2(T-T_0)^2)$$

$$R_{T1}=R_{T10}(1+\alpha_1(T-T_0)+\beta_1(T-T_0)^2);$$

wherein $T_0$=some chosen arbitrary yet fixed temperature in the region of operation of the sensor, for example, room temperature;

T=temperature to be measured $R_{T20}$=value of $R_{T2}$ at temperature $T_0$ $R_{T10}$=value of $R_{T1}$ at temperature $T_0$ wherein the first and second order temperature coefficients for the illustrated embodiment are as follows:

$\alpha_1=-0.0011$
$\alpha_2=0.00101$
$\beta_1=3*10^{-8}$
$\beta_2=6.4*10^{-7}$ wherein preferably $R_{T1}$ has a negative temperature coefficient, and
$R_{T2}$ has a positive temperature coefficient.

Accordingly, as temperature increases, $R_{T1}$ decreases, $R_{T2}$ increases and $V_T$ increases. As the temperature decreases, $R_{T1}$ increases, $R_{T2}$ decreases and $V_T$ decreases.

The resistor network preferably includes a resistor divider made up of $R_1$ and $R_2$ to create an offset voltage which allows a single supply as compared to the two normally required for an operational amplifier.

The equation of operation of the sensor 100 is derived as below:

$$V_{cc}-V^-/R_1+0-V^-/R_2+V_{out}-V^-/R_{FB}=0$$

$$V_{cc}/R_1+V_{out}/R_{FB}=(1/R_1+1/R_2+1/R_{FB})V^-$$

$$V_{out}/R_{FB}=(1/(R_1//R_2)+1/R_{FB})V^--V_{cc}/R_1$$

$$V_{out}=(R_{FB}/(R_1//R_2)+1)V^--(R_{FB}/R_1)V_{cc}$$

wherein $V^-=V_T$ if the gain A of the operational amplifier is much larger than the closed loop gain: $A>>R_{FB}/(R_1//R_2)+1$. Therefore:

$$V_{out} = AV_T - (R_{FB}/R_1)V_{CC}$$
$$V_{out} = A(R_{T2}/(R_{T2}+R_{T1}))V_{CC} - (R_{FB}/R_1)V_{CC}$$
$$= \text{(temp. term)} - \text{(offset term with no temp. dependence)}$$

With the preferred embodiment, $V_{out}$ ranges from zero to five volts in response to a temperature range of $-40°$ to $+150°$ centigrade with very little non-linearity.

The resistors $R_{T1}$ and $R_{T2}$ are trimmed such that $V_T=V^-$. $R_1$ and $R_2$ are trimmed for proper offset. The resistor $R_{FB}$ is set to get the correct sensitivity to temperature. The temperature response is measured and $R_{FB}$ is trimmed.

As with the first embodiment, preferably the sensor 100 of the second embodiment is an integrated circuit which is preferably, though not necessarily, formed on a single substrate with no external resistors. To manufacture the sensor 100 as an integrated circuit, conventional integrated circuit manufacturing steps can be utilized.

The second embodiment of the temperature sensor uses all doped polysilicon resistors. Unlike the first embodiment, the sensor 100 does not use the full bridge as the temperature sensing element. The first arm or half-bridge 102 of the sensor 100 is temperature dependent while the second arm 106 is not temperature dependent. The two polysilicon resistors in the first arm 102 act as the temperature sensing element of the sensor 100 such that $V_T$ varies with changes in ambient temperature. The purpose of the second arm or half-bridge 106 is to set the gain. Therefore, the sensor 100 uses the half bridge 102 in combination with the resistor network of the second arm 106 and the feedback resistor $R_{FB}$ to modify the gain of the sensor 100. In this arrangement, only one operational amplifier can be used in the sensor 100 and turned into a single ended amplifier with the resistor network to modify the gain. The resistor network of $R_1$ and $R_2$ creates an offset voltage which allows for a single supply to the amplifier. It is important to note that the offset is trimmable independent of temperature.

Various other features and advantages of the invention are set forth in the following claims.

We claim:

1. A temperature sensor comprising:
   a bridge having a first arm including a first and a second doped polysilicon resistor and a first node between said first and second resistor, and a second arm including a third and a fourth doped polysilicon resistor and a second node between said third and fourth resistors, wherein said resistors generate a differential voltage at said first and second nodes that is functionally related to ambient temperature;
   an amplifier in communication with said bridge having as an input said differential voltage, said amplifier having a gain that is adjustable in response to variations in ambient temperature, and said amplifier having an electrical signal output that is related to the ambient temperature; and
   a doped polysilicon feedback resistor connected between said input and said output of said amplifier, said feedback resistor having a predetermined temperature coefficient such that as the ambient temperature varies, the resistance of said feedback resistor varies to automatically adjust said gain of said amplifier.

2. A temperature sensor as set forth in claim 1 wherein said first and third doped polysilicon resistors are doped with the same dopant.

3. A temperature sensor as set forth in claim 1 wherein said second and fourth doped polysilicon resistors are doped with the same dopant.

4. A temperature sensor as set forth in claim 1 wherein said first polysilicon resistor having a first temperature coefficient, said second polysilicon resistor having a second temperature coefficient, and wherein said first temperature coefficient is different from said second temperature coefficient so as to generate a first reference voltage at said first node such that said first reference voltage varies in response to variations in ambient temperature.

5. A temperature sensor as set forth in claim 4 wherein said third polysilicon resistor having a third temperature coefficient, said fourth polysilicon resistor having a fourth temperature coefficient, and wherein said third temperature coefficient is different from said fourth temperature coefficient so as to generate a second reference voltage at said second node such that said second reference voltage varies in response to variations in ambient temperature.

6. A temperature sensor as set forth in claim 1 wherein said amplifier is an operational amplifier and wherein said operational amplifier includes an inverting input electrically connected to said first node and a non-inverting input electrically connected to said second node.

7. A temperature sensor set forth in claim 6 wherein said feedback resistor is connected between said inverting input of said operational amplifier and said output.

8. A temperature sensor as set forth in claim 1 wherein said sensor is an integrated circuit.

9. A method of measuring ambient temperature, said method of comprising the steps:
   (a) providing an amplifier having a predetermined gain at a predetermined reference temperature;
   (b) generating a differential signal functionally related to ambient temperature using a bridge comprised of a first arm including a first and a second doped polysilicon resistor and a first node between the first and second resistor, and a second arm including a third and a fourth doped polysilicon resistor and a second node between the third and fourth resistors, wherein the resistors generate the differential signal at the first and second nodes;
   (c) amplifying the differential signal using the amplifier; and
   (d) adjusting the gain of the amplifier in response to changes in ambient temperature using a doped polysilicon feedback resistor connected between the input and the output of the amplifier, the feedback resistor having a predetermined temperature coefficient such that as the ambient temperature varies, the resistance of the feedback resistor varies to automatically adjust the gain of the amplifier so as to produce an electrical output indicative of the ambient temperature.

10. A method of measuring ambient temperatures as set forth in claim 9 wherein the first doped polysilicon resistor having a first temperature coefficient, the second doped polysilicon resistor having a second temperature coefficient, the third doped polysilicon resistor having a third temperature coefficient, the fourth doped polysilicon resistor having a fourth temperature coefficient and further including the step of selecting the temperature coefficients of the resistors so as to generate a first reference voltage at the first node, the first reference voltage varying in a known way with an increase in ambient temperature, and to generate a second reference voltage at the second node, the second reference voltage varying in a known way in response in an increase in ambient temperature.

11. A method of measuring ambient temperature as set forth in claim 10 wherein the first reference voltage decreases in response to increases in ambient temperature and wherein the second reference voltage increases in response to increases in ambient temperature.

12. A method of measuring ambient temperature as set forth in claim 9 wherein the feedback resistor has a temperature coefficient and further including the step of selecting the temperature coefficient of the feedback resistor so that the gain of said amplifier varies in response to variations in ambient temperature to produce electrical output indicative of the ambient temperature.

13. A temperature sensor comprising:
   an integrated circuit component including a full-bridge doped polysilicon resistor network having a first arm for generating a first reference voltage and having a second arm for generating a second reference voltage, said first arm including a first and a second doped polysilicon resistor, said second arm including a third and a fourth doped polysilicon resistor, said resistors being doped with an impurity so as to have predetermined temperature coefficients such that the impedance of said component varies in accordance with changes in ambient temperature; and
   an amplifier for generating an electrical output functionally related to the impedance of said component, said amplifier having an input, an output, and a gain, said gain varying in accordance with changes in ambient temperature.

14. A temperature sensor as set forth in claim 13 wherein said first and second doped polysilicon resistors have temperature coefficients such that as the ambient temperature increases, said first reference voltage decreases.

15. A temperature sensor as set forth in claim 13 wherein said third and fourth doped polysilicon resistors have temperature coefficients such that as the ambient temperature increases, said second reference voltage increases.

16. A temperature sensor as set forth in claim 13 wherein said amplifier is an operational amplifier having an inverting input and a non-inverting input and wherein said first node is connected to said inverting input and wherein said second node is connected to said non-inverting input.

17. A temperature sensor comprising:
   a temperature sensing element, said temperature sensing element including first and second doped polysilicon resistors having different temperature coefficients, wherein said temperature sensing element produces a first voltage that varies with changes in ambient temperature;
   a resistor network, said resistor network including third and fourth doped polysilicon resistors having the same temperature coefficients;
   an amplifier having an input, an output and a feedback gain, said feedback gain being unaffected by changes in ambient temperature; and
   a feedback resistor connected between said input and said output of said amplifier, said feedback resistor being a doped polysilicon resistor.

18. A temperature sensor as set forth in claim 17 wherein said feedback resistor has the same temperature coefficient as said third and said fourth resistors.

19. A temperature sensor as set forth in claim 17 wherein said third, said fourth and said feedback resistors determine said feedback gain of said amplifier.

20. A temperature sensor as set forth in claim 17 wherein said amplifier is an operational amplifier.

21. A temperature sensor as set forth in claim 17 wherein said resistor network creates an offset voltage, wherein said input to said amplifier includes said first voltage and said offset voltage.

22. A temperature sensor as set forth in claim 17 wherein said sensor includes a full bridge, said bridge having a first arm and a second arm, said first arm including said temperature sensing element and said second arm including said resistor network.

23. A temperature sensor as set forth in claim 17 wherein said first resistor having a negative temperature coefficient and wherein said second resistor having a positive temperature coefficient.

24. A temperature sensor comprising:
   a bridge comprised of a first arm including a first and a second doped polysilicon resistor and a first node between said first and second resistor, and a second arm including a third and a fourth doped polysilicon resistor and a second node between said third and fourth resistors, wherein said first and second resistors generate a first voltage at said first node that is functionally related to ambient temperature, wherein said third and fourth resistors generate an offset voltage that is non-functionally related to temperature;
   an amplifier in communication with said bridge, said amplifier having as an input said first voltage and said offset voltage, having an output that is related to the ambient temperature and having a feedback gain; and
   a doped polysilicon feedback resistor connected between said input and said output of said amplifier.

25. A temperature sensor as set forth in claim 24 wherein said third, fourth and feedback resistors have the same temperature coefficients.

26. A temperature sensor as set forth in claim 24 wherein said feedback gain is non-functionally related to temperature.

27. A temperature sensor as set forth in claim 24 wherein said amplifier is an operational amplifier and wherein said operational amplifier includes an inverting input electrically connected to said first node and a non-inverting input electrically connected to said second node.

28. A temperature sensor set forth in claim 24 wherein said feedback resistor is connected between said inverting input of said operational amplifier and said output.

* * * * *